US008355127B2

(12) United States Patent
Govyadinov et al.

(10) Patent No.: US 8,355,127 B2
(45) Date of Patent: Jan. 15, 2013

(54) GRIN LENS ARRAY LIGHT PROJECTOR AND METHOD

(75) Inventors: Alexander Govyadinov, Corvallis, OR (US); Brett E. Dahlgren, Albany, OR (US); Lenward Seals, Gaithersburg, MD (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 224 days.

(21) Appl. No.: 12/837,098

(22) Filed: Jul. 15, 2010

(65) Prior Publication Data

US 2012/0013906 A1 Jan. 19, 2012

(51) Int. Cl.
*G01N 21/00* (2006.01)

(52) U.S. Cl. ........................................................ 356/338

(58) Field of Classification Search ........................ None
See application file for complete search history.

(56) References Cited

U.S. PATENT DOCUMENTS 4,422,719 A 12/1983 Orcutt
5,304,814 A 4/1994 Markham
5,428,218 A 6/1995 Toughlian et al.
5,589,858 A 12/1996 Kadowaki et al.
5,621,524 A 4/1997 Mitani
5,742,303 A 4/1998 Taylor et al.
5,774,141 A 6/1998 Cooper et al.
5,856,833 A 1/1999 Elgee et al.
5,896,145 A 4/1999 Osborne et al.
6,088,134 A 7/2000 Schmidt
6,168,258 B1 1/2001 Lou et al.
6,299,275 B1 10/2001 Elgee
6,513,900 B2 2/2003 Endo et al.
6,517,184 B1 2/2003 Bruch et al.
6,525,863 B1 2/2003 Riza
6,565,179 B1 5/2003 Bruch et al.
6,585,349 B1 7/2003 Lou et al.
6,648,444 B2 11/2003 Valero et al.
6,747,684 B2 6/2004 Ornellas et al.
6,767,122 B2 7/2004 Honguh et al.
6,769,756 B2 8/2004 Su et al.
6,786,626 B2 9/2004 Wu et al.
6,802,580 B2 10/2004 Valero
6,814,422 B2 11/2004 Bruch et al.
6,851,816 B2 2/2005 Wu et al.
6,877,838 B2 4/2005 Elgee (Continued)

FOREIGN PATENT DOCUMENTS

JP 2001113725 4/2001

(Continued)

OTHER PUBLICATIONS

LightPath Technologies, "GRADIUM Lenses," pp. 2 (Jun. 16, 2009). <http://www.lightpath.com/products/GRADIUM.php>.

(Continued)

*Primary Examiner* — Tu Nguyen

(57) ABSTRACT

One aspect is a light source assembly in a drop detection arrangement. The light source assembly includes a light source and a gradient-index lens array to at least partially collimate light from the light source and to project a collimated light beam into the drop detection arrangement in a direction transverse to a drop direction of droplets in the drop detection arrangement. The light source assembly produces the light beam such that it has a beam width in a direction transverse to the drop direction that is larger than a beam height in the drop direction.

20 Claims, 7 Drawing Sheets

U.S. PATENT DOCUMENTS

| | | | | |
|---|---|---|---|---|
| 6,935,717 | B2 | 8/2005 | Su et al. | |
| 6,966,664 | B2 | 11/2005 | Wu | |
| 6,969,159 | B2 | 11/2005 | Su et al. | |
| 6,984,013 | B2 | 1/2006 | Arqullevich et al. | |
| 7,055,925 | B2 | 6/2006 | Subirada et al. | |
| 7,125,151 | B2 | 10/2006 | Uemura et al. | |
| 7,140,762 | B2 | 11/2006 | Wu et al. | |
| 7,249,830 | B2 | 7/2007 | Hawkins et al. | |
| 7,267,467 | B2 | 9/2007 | Wu et al. | |
| 7,287,824 | B2 | 10/2007 | Subirada et al. | |
| 7,287,833 | B2 | 10/2007 | Howard | |
| 7,364,276 | B2 | 4/2008 | Piatt et al. | |
| 7,434,919 | B2 | 10/2008 | Hawkins et al. | |
| 7,442,180 | B2 | 10/2008 | Vitello et al. | |
| 7,452,053 | B2 | 11/2008 | Valles et al. | |
| 7,490,918 | B2 | 2/2009 | Nagashima | |
| 7,513,616 | B2 | 4/2009 | Lin | |
| 7,832,822 | B2 | 11/2010 | Kiyama et al. | |
| 2001/0019480 | A1 | 9/2001 | Fujino et al. | |
| 2003/0193608 | A1 | 10/2003 | Yen | |
| 2005/0021244 | A1 * | 1/2005 | Nicoli et al. | 702/29 |
| 2005/0024410 | A1 | 2/2005 | Subirada et al. | |
| 2005/0253890 | A1 * | 11/2005 | Nagashima | 347/19 |
| 2006/0103691 | A1 | 5/2006 | Dietl et al. | |
| 2006/0120098 | A1 | 6/2006 | Ikeda et al. | |
| 2006/0139392 | A1 | 6/2006 | Fernandez et al. | |
| 2006/0187651 | A1 | 8/2006 | Kim et al. | |
| 2006/0279601 | A1 | 12/2006 | Unosawa et al. | |
| 2007/0024658 | A1 | 2/2007 | Diol et al. | |
| 2007/0030300 | A1 | 2/2007 | Jeong | |
| 2007/0064068 | A1 | 3/2007 | Piatt et al. | |
| 2008/0180471 | A1 | 7/2008 | Han | |
| 2008/0246803 | A1 | 10/2008 | Barger et al. | |
| 2009/0091595 | A1 | 4/2009 | Hayashi et al. | |
| 2009/0141057 | A1 | 6/2009 | Hayashi et al. | |
| 2009/0179934 | A1 | 7/2009 | Takagi et al. | |
| 2009/0244141 | A1 | 10/2009 | Govyadinov et al. | |
| 2009/0244163 | A1 | 10/2009 | Govyadinov | |
| 2009/0273620 | A1 | 11/2009 | Govyadinov et al. | |
| 2009/0310206 | A1 | 12/2009 | Gluckstad | |
| 2010/0207989 | A1 | 8/2010 | Govyadinov | |
| 2011/0090275 | A1 | 4/2011 | Govyadinov et al. | |

FOREIGN PATENT DOCUMENTS

| | | |
|---|---|---|
| JP | 2005083769 | 3/2005 |
| JP | 2006047235 | 2/2006 |
| JP | 2006346906 | 12/2006 |
| JP | 2007119971 | 5/2007 |
| WO | 2007015808 | 2/2007 |
| WO | 2009120436 | 10/2009 |

OTHER PUBLICATIONS

NSG Europe, “SELFOC Laser Diode Collimating Lenses,” pp. 2 (Aug. 25, 2010). <http://www.nsgeurope.com/collimating.shtml>.

The Restriction Requirement for U.S. Appl. No. 12/381,873 mailed Sep. 29, 2010 (6 pages).

The Restriction Requirement for U.S. Appl. No. 12/079,338 mailed Mar. 17, 2011 (7 pages).

The Restriction Requirement for U.S. Appl. No. 12/388,805 mailed on Jul. 14, 2011 (6 pages).

The Non-Final Office Action for U.S. Appl. No. 12/254,864 mailed on Jun. 11, 2010 (23 pages).

The Office Action for U.S. Appl. No. 12/381,873 mailed on Feb. 4, 2011 (12 pages).

The Office Action for U.S. Appl. No. 12/079,338 mailed on Jul. 25, 2011 (15 pages).

The Office Action for U.S. Appl. No. 12/388,805 mailed on Aug. 25, 2011(19 pages).

The Office Action for U.S. Appl. No. 12/381,873 mailed Sep. 1, 2011 (11 pages).

The Notice of Allowance for U.S. Appl. No. 12/254,864 mailed Dec. 1, 2010 (12 pages).

The International Search Report for International Application No. PCT/US2009/034892 mailed on Jul. 28, 2009 (7 pages).

The Written Opinion of the International Searching Authority for International Application No. PCT/US2009/034892 mailed on Jul. 28, 2009 (5 pages).

Svanholm, Erik, “Printability and Ink-Coating Interactions in Inkjet Printing,” Dissertation, Karlstad University Studies 2007:2, pp. 58 (Feb. 2007).

McLeod, Euan et al., “Complex Beam Sculpting with Tunable Acoustic Gradient Index Lenses,” SPIE, Complex Light and Optical Forces, vol. 6483, pp. 1-9, (2007).

* cited by examiner

GRIN LENS ARRAY LIGHT PROJECTOR AND METHOD

BACKGROUND

In some applications, drop detection devices are utilized to detect liquid drops ejected by ejector nozzles. Based on the detection of liquid drops, the status of a particular nozzle or groups of nozzles can be diagnosed. In some cases light scattering from the ejected drops is used in the drop detection devices.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
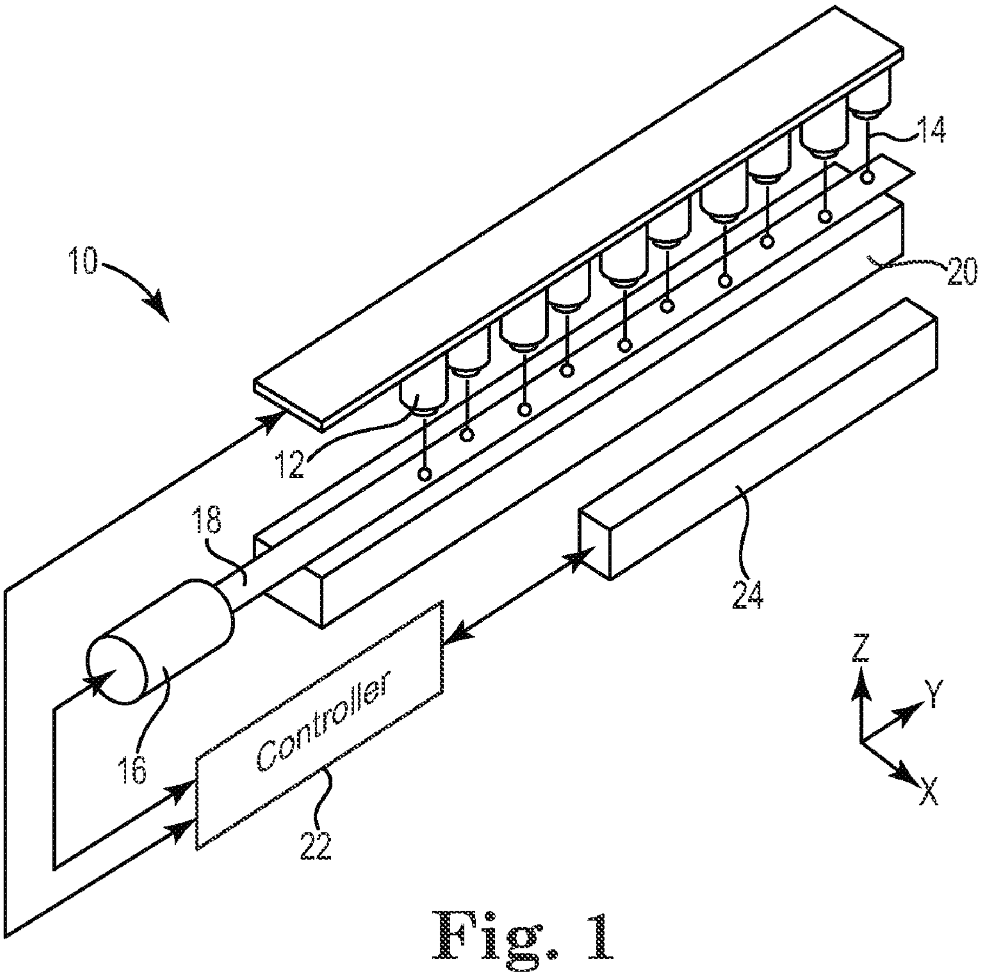
FIG. 1 is a drop detector arrangement in accordance with one embodiment.

FIG. 1 illustrates a drop detector arrangement 10 in accordance with one embodiment. In one embodiment, drop detector arrangement 10 includes a plurality of drop ejectors 12 to dispense a liquid droplet 14. Arrangement 10 further includes a light source assembly 16, which emits a light beam 18. Arrangement 10 also includes service station 20, controller 22, and light collector 24. In the illustration of FIG. 1, light beam 18 is projected in a y-axis direction, while droplets 14 drop in a z-axis direction. Light beam 18 has a beam width in an x-axis direction.

In operation of one embodiment, drop detector arrangement 10 is for use in a variety of applications where the controlled ejection of liquid droplets 14 is to be monitored. For example, in one application ink drops are deposited on print media in a print engine for an inkjet printer. In such an application, drop detector arrangement 10 may be used to monitor the ejection of ink. In other applications, drop detector arrangement 10 may be used to monitor the ejection of liquid in biochemical tests, diagnostic strips or device coating applications.

In one embodiment, controller 22 controls the plurality of drop ejectors 12 such that liquid droplets 14 are controllably ejected to service station 20. In one embodiment, print media is received adjacent service station 20 such that liquid droplets 14 are controllably deposited on the print media.

In one embodiment, light source assembly 16 projects light beam 18 in the y-axis direction between the plurality of drop ejectors 12 and service station 20. As such, when liquid droplets 14 are ejected from drop ejectors 12 in the z-axis direction, liquid droplets 14 pass through light beam 18 as they drop to service station 20. In various embodiments, light source 16 assembly includes a collimated source, such as a laser source, or an LED. In various embodiments, light source assembly 16 produces a collimated light beam 18 with an elliptical or rectangular profile, that is, a larger width in the x-axis direction than a height in the z-axis direction, as will be further discussed below.

As a liquid droplet 14 passes through light beam 18, light from light beam 18 is scattered in various directions. Light collector 24 is illustrated adjacent light beam 18 and some of the scattered light will enter light collector 24. Light collector 24 is located in various adjacent positions relative to light beam 18 in accordance with various embodiments.

In one embodiment, light collected into light collector 24 from the light scattering that occurred when liquid droplet 14 passed through light beam 18 can be used to measure the effectiveness or status of liquid droplet 14 from one or more of ejectors 12. For example, if controller 22 directs one particular drop ejector to eject a liquid droplet 14 at a particular point in time, corresponding light scattering from liquid droplet 14 passing through light beam 18 should enter light collector 24. By monitoring the collected light and correlating it with control signals from controller 22, a determination can be made as to whether a liquid droplet 14 did in fact eject, as well as determinations about the size, velocity and quality of liquid droplet 14.

In one embodiment, light collector 24 includes a light detector. In one embodiment, a first end of light collector 24 is located adjacent light source assembly 16 and the light detector is located at a second end of light collector 24, which is opposite the first end. In one example, the light detector is coupled to controller 22, which processes light signals that are collected in light collector 24 and then coupled into the light detector. In one example, a separate controller from controller 22 may be used to process the collected light signals.

Various configurations of ejectors 12 are possible according to various embodiments. For example, pluralities of ejectors 12 can be formed in a silicon die, sometimes in staggered rows across a distance in the x-axis direction as illustrated in FIG. 1. In ink applications where multiple colored inks are used, multiple sets of rows of ejectors 12 are possible. In such applications, light source 16 assembly produces a light beam 18 that has a beam width $W_{18}$ (in the x-axis direction) adjacent the rows of ejectors 12 (see, for example, FIG. 3). In one embodiment, the beam width $W_{18}$ is sufficient to cover all the rows of ejectors 12 such that any liquid droplet 14 ejected from them will pass through somewhere within the width $W_{18}$ of light beam 18.

In some embodiments, the aspect ratio of light beam 18 is also controlled such that ejected liquid droplet 14 does not have to pass through a large distance of light so the signal produced from the scattered light is maintained at a relatively short duration. In other words, the beam height $H_{18}$ of light beam 18 is kept shorter (in the z-axis direction as illustrated in FIG. 1) than the beam width $W_{18}$, forming a rectangular or elliptical shape (see, for example, FIG. 3).

In one embodiment, light source assembly 16 includes a plurality of parallel lenses, each of which has a gradient index (GRIN). In some embodiments, the GRIN lenses are radial and in others they are axial. Radial GRIN lenses have a radially-decreasing refractive index, such as cylindrical GRIN SOLFOC® lenses, and axial GRIN lenses are flat with an index varying from the front to the back of the lens. Both focus light using the variable refraction index distribution. Light source assembly 16 with GRIN lens arrays produce a controlled light beam 18 with a focused aspect ratio.

FIGS. 2A-2D illustrate light source assemblies 30, 40, 50 and 60. In various embodiments, light source assemblies 30, 40, 50 and 60 are used in drop detector arrangements, such as arrangement 10 above. In one embodiment, light source assemblies 30, 40, 50 and 60 produce a collimated light beam 18 with a controlled aspect ratio. In one embodiment, light beam 18 is collimated light with rays that are nearly parallel, and therefore spread slowly as light beam 18 propagates.

In one embodiment, the aspect ratio of light beam 18 is controlled so that its beam width $W_{18}$ adequately covers drop ejectors 12, yet its beam height $H_{18}$ produces a relatively short signal representing the scattered light from a liquid droplet 14 passing through light beam 18. In one embodiment, light beam 18 has a width $W_{18}$ of 4 mm and a height $H_{18}$ of 1 mm.

Figure 2A:
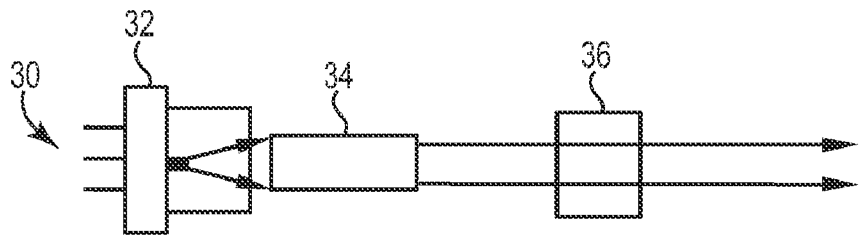
FIGS. 2A-2D illustrate light source assemblies in accordance with various embodiments.

In FIG. 2A, light source assembly 30 includes a laser diode 32, GRIN lens array 34 and exit lens 36. In operation, laser diode 32 generates light that is directed into lens array 34. In one embodiment, GRIN lens array 34 has a plurality of parallel lenses, each of which has a gradient oriented to at least partially collimate light from the laser diode 32. In one embodiment, lens array 34 at least partially collimates light in the slow axis, that is, the axis having a small degree divergence angle. Light from lens array 34 then passes through exit lens 36, which in one embodiment, at least partially collimates light in the fast axis, that is, the axis having a large divergence angle. Light emerging from exit lens 36, which in one embodiment is a cylindrical lens, accordingly has a controlled beam profile with a larger width than height.

Although exit lens 36 is illustrated as a cylindrical lens in accordance with one embodiment, various other configurations of lens 36 are also possible. For example, lens 36 can be various combinations of spherical, aspheric, cylindrical, acylindrical, Fresnel, diffraction, and lenticular lenses. Also, in one embodiment, laser diode 32 is an edge emission diode, and in another, it is a vertical cavity surface emitting laser.

Figure 2B:
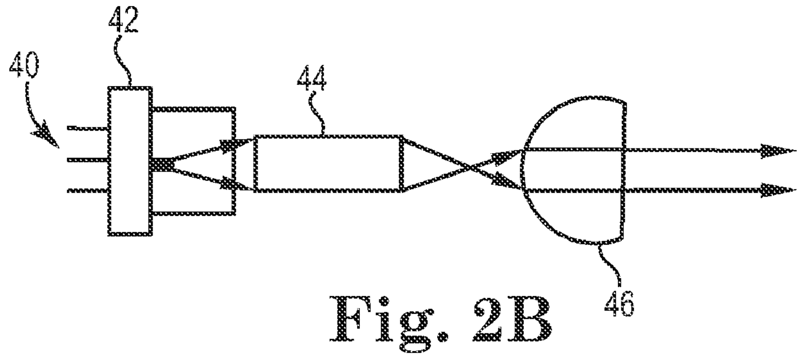

In FIG. 2B, light source assembly 40 includes a laser diode 42, GRIN lens array 44 and exit lens 46. In operation, laser diode 42 generates light that is directed into lens array 44. In one embodiment, GRIN lens array 44 has a plurality of parallel lenses, each of which has a gradient oriented to at least partially collimate light from the laser diode 42. In one embodiment, GRIN lens array 44 at least partially collimates light in the fast axis, that is, the axis having a large degree divergence angle. Light from GRIN lens array 44 then passes through exit lens 46, which one embodiment, at least partially collimates light in the slow axis, that is, the axis having a small divergence angle. Light emerging from exit lens 46, which in one embodiment is a cylindrical lens, accordingly has a controlled beam profile with a larger width than height.

Although lens 46 is illustrated as a cylindrical lens in accordance with one embodiment, various other configurations of lens 46 are also possible. For example, lens 46 can be various combinations of spherical, aspheric, cylindrical, acylindrical, Fresnel, diffraction, and lenticular lenses. Also, in one embodiment, laser diode 42 is an edge emission diode, and in another, it is a vertical cavity surface emitting laser.

Figure 2C:
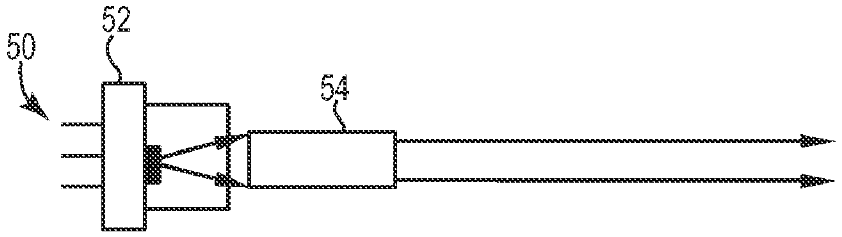

In FIG. 2C, light source assembly 50 includes a laser diode 52 and GRIN lens array 54. In operation, laser diode 52 generates light that is directed into lens array 54. In one embodiment, GRIN lens array 54 has a plurality of parallel lenses, each of which has a gradient oriented to at least partially collimate light from the laser diode 52. In one embodiment, GRIN lens array 54 at least partially collimates a central portion of the light in one direction (either fast or slow axis) and at least partially collimates the entire width in the other axis. In such a configuration, an additional lens is not used in one embodiment, and light emerging from GRIN lens 54 has a controlled beam profile with a larger width than height.

Figure 2D:
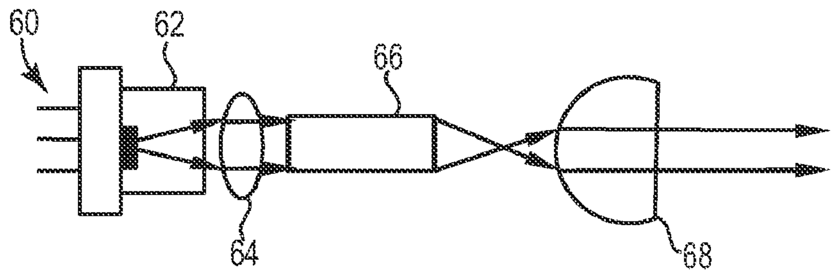

In FIG. 2D, light source assembly 60 includes a laser diode 62, initial lens 64, GRIN lens array 66 and exit lens 68. In operation, laser diode 62 generates light that is directed into initial lens 64. In one embodiment, laser diode 62 and initial lens 64 are packaged as a single unit.

Although lenses 64 and 68 are respectively illustrated as spherical and cylindrical lenses in accordance with one embodiment, various other configurations of lenses 64 and 68 are also possible. For example, lenses 64 and 68 can be various combinations of spherical, aspheric, cylindrical, acylindrical, Fresnel, diffraction, and lenticular lenses. Also, in one embodiment, laser diode 62 is an edge emission diode, and in another, it is a vertical cavity surface emitting laser.

Light from initial lens 64 is directed into GRIN lens array 66. In one embodiment, GRIN lens array 66 has a plurality of parallel lenses, each of which has a gradient oriented to at least partially collimate light from the laser diode 62. In one embodiment, GRIN lens array 66 collimates light in one axis (either the fast or slow axis) and over-collimates light in the other axis. Light from GRIN lens array 66 then passes through exit lens 68, which in one embodiment, compensates for the over-collimated light in one axis from the GRIN lens array 66. Light emerging from exit lens 68 accordingly has a controlled beam profile with a larger width than height.

Figure 3:
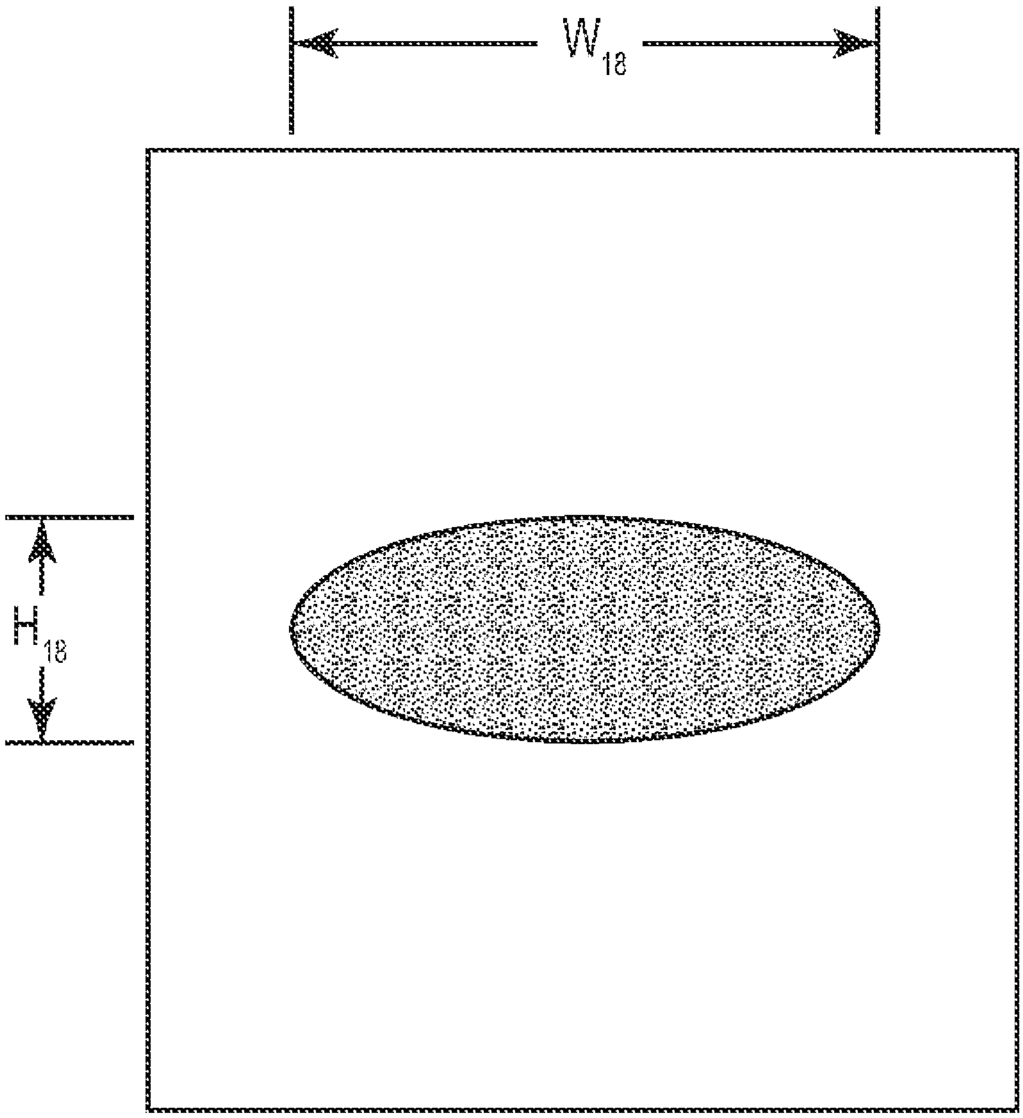
FIG. 3 illustrates a light pattern representative of a cross-section of a light beam from a light source assembly in accordance with one embodiment.

FIG. 3 illustrates a light beam profile, such as produced with light source assemblies 30, 40, 50 and 60 illustrated in FIGS. 2A-2D. A sample cross-section or profile of light is illustrated for the light beam. As illustrated, light has been collimated in one axis such that the light profile has a larger width than height. In one embodiment, light beam 18 from light source assembly 16 has a width of 4 mm and a height of 1 mm. In one embodiment, such a configuration provides a light beam 18 with sufficient width $W_{18}$ to cover drop ejectors 12 and a height $H_{18}$ that produces a relatively short signal from the scattered light.

Figure 4:
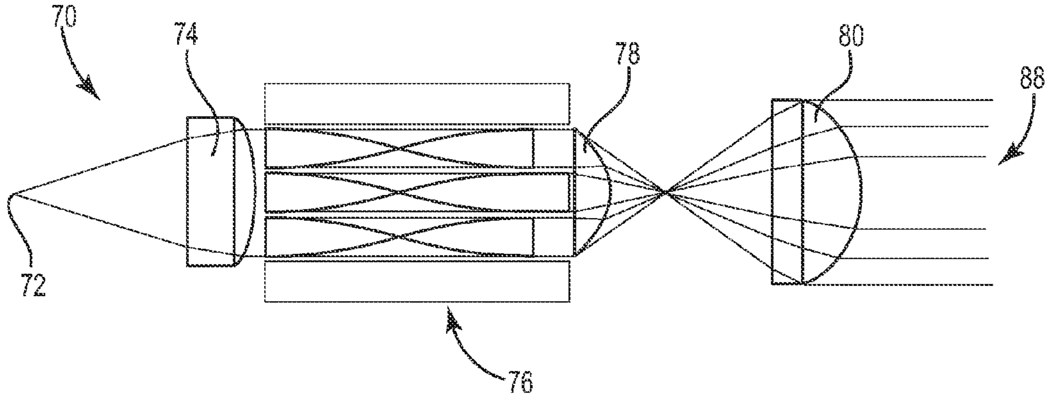
FIG. 4 illustrates a light source assembly in accordance with one embodiment.

FIG. 4 illustrates light source assembly 70 in accordance with one embodiment. In one embodiment, light source assembly 70 is used in conjunction with a drop detector arrangement, such as described and discussed above. In one embodiment, light source assembly 70 includes a laser diode 72, aspheric lens 74, GRIN lens array 76, cylindrical lens 78 and spherical lens 80. In one embodiment, light source assembly 70 at least partially collimates light from laser diode 72 such that a light beam 88 emerging from spherical lens 80 has a controlled beam profile with a larger beam width $W_{88}$ than beam height $H_{88}$. In one embodiment, light beam 88 includes individual light beamlets of light.

In light source assembly 70, light from laser diode 72 is at least partially collimated by aspheric lens 74 into GRIN lens array 76. GRIN lens array 76 includes a plurality of parallel GRIN lenses, which produce individual beamlets of light. In the illustration, there are three individual GRIN lenses in GRIN lens array 76. Cylindrical lens 78 is positioned relative to one end of GRIN lens array 76 such that the beamlets of light from GRIN lens array 76 are focused at a single point by cylindrical lens 78. In one embodiment, focusing the beamlets at a single point prevents substantial divergence of the light and helps keep the light substantially focused. In another embodiment, cylindrical lens 78 is a faceted cylinder, and in another, is a prism.

Spherical lens 80 at least partially collimates the beamlets resulting light beam 88. In one case, light beam 88 includes individual substantially parallel light beams correlating with each GRIN lens of GRIN lens array 76. In the illustration of FIG. 4, the three substantially parallel beamlets of light of light beam 88 exit spherical lens 80. More or less beamlets of light can make up light beam 88 by correspondingly adding or subtracting the number of individual GRIN lenses of GRIN lens array 76.

Figure 5:
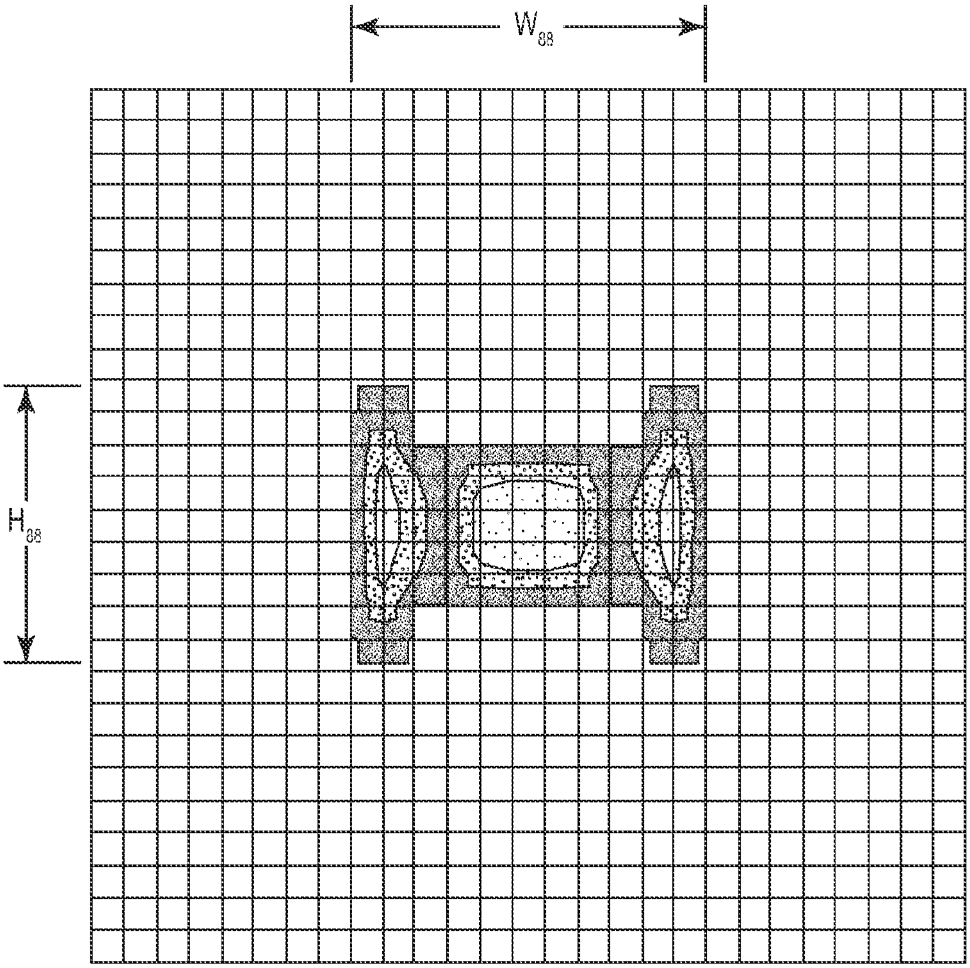
FIG. 5 illustrates a light pattern representative of a cross-section of a light beam from a light source assembly in accordance with one embodiment.

FIG. 5 illustrates a profile of a light pattern representative of a light beam 88 from light source assembly 70 in accordance with one embodiment. In the illustration, light beam 88 correlates with the three substantially parallel light beams from the individual lenses of GRIN lens array 76. As with previously described light beam 18, light beam 88 also has an overall beam width $W_{88}$ that is larger than is its overall beam height $H_{88}$.

In one embodiment, light source assembly 70 is in a drop detector arrangement (such as arrangement 10 above). In one embodiment, the drop detector arrangement includes a plurality of drop ejectors that are in three parallel rows. In this way, each individual beamlet of light of light beam 88 is substantially below a row of ejectors. Accordingly, light beam 88 in one embodiment does not provide light in locations where no drops will be ejected. Instead, light is focused under ejectors where scattered light is to be produced. Energy savings can be realized by only projecting light where it is used in the arrangement.

Where additional or less rows of ejectors are provided in a drop detector arrangement, a correlating amount of individual beamlets of light in light beam 88 can be produced with light source assembly 70, such as by adjusting the number of individual GRIN lenses in GRIN lens array 76.

In one embodiment, light beam 88 of light source assembly 70 works over a relatively long distance in a drop detector arrangement. For example, if placed in drop detector arrangement 10 illustrated in FIG. 1, light source assembly 70 (replacing light source assembly 16) produces a light beam 88 (replacing light beam 18) that has a consistent profile over its length in the y-axis direction. Although its beam width $W_{88}$ and beam height $H_{88}$ will both increase as beam 88 moves out in the y-axis direction, the configuration of light source assembly 70 provides a usable light beam 88 over a substantial distance over its length in the y-axis direction. The light profile illustrated in FIG. 5 is a cross-sectional view taken at a location in the y-axis direction, and is representative of the light beam 88 profile over the distance where droplets will pass through.

Figure 6:
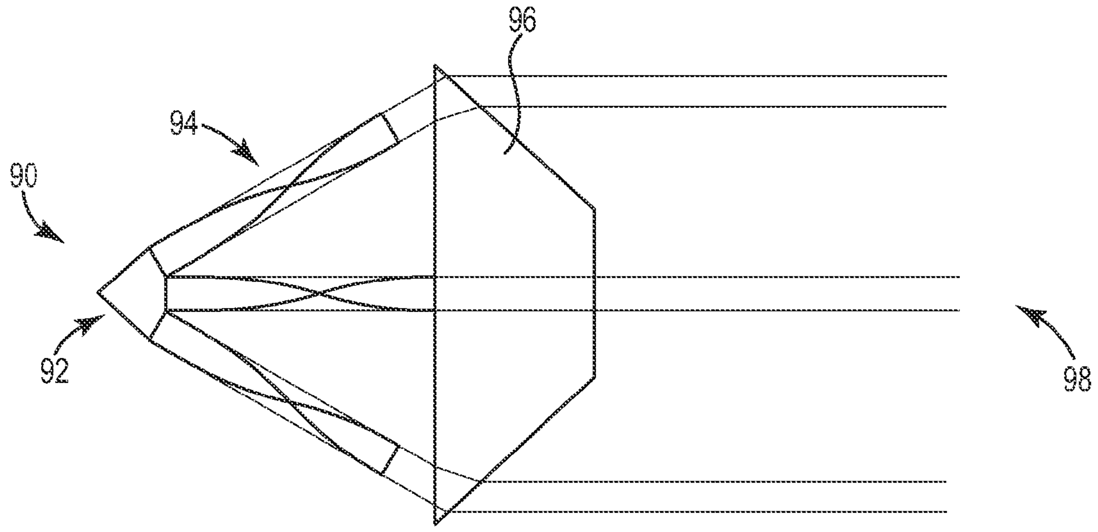
FIG. 6 illustrates a light source assembly in accordance with one embodiment.

FIG. 6 illustrates a light source assembly 90 in accordance with one embodiment. In one embodiment, light source assembly 90 is used in conjunction with a drop detector arrangement, such as described and discussed above. In one embodiment, light source assembly 90 includes a laser diode 92, GRIN lens array 94, and cylindrical prism 96. In one embodiment, light source assembly 90 at least partially collimates light from laser diode 92 such that a light beam 98 emerging from cylindrical prism 96 has a controlled beam profile with a larger beam width $W_{98}$ than beam height $H_{98}$. In one embodiment, light beam 98 includes individual light beamlets of light.

In light source assembly 90, light from laser diode 92 is directed into GRIN lens array 94. GRIN lens array 94 includes a plurality of fan-arrayed GRIN lenses, which produce individual beamlets of light. In the illustration, there are three GRIN lenses in GRIN lens array 94. Cylindrical prism 96 is positioned relative to one end of GRIN lens array 94 such that the beamlets of light are projected as 3 collimated beamlets of light, making up light beam 98.

In one embodiment, GRIN lens array includes individual GRIN lenses fanned out at angles relative to each other, such that these relative angles determine spacing between each of the individual beamlets of light of light beam 98.

Figure 7:
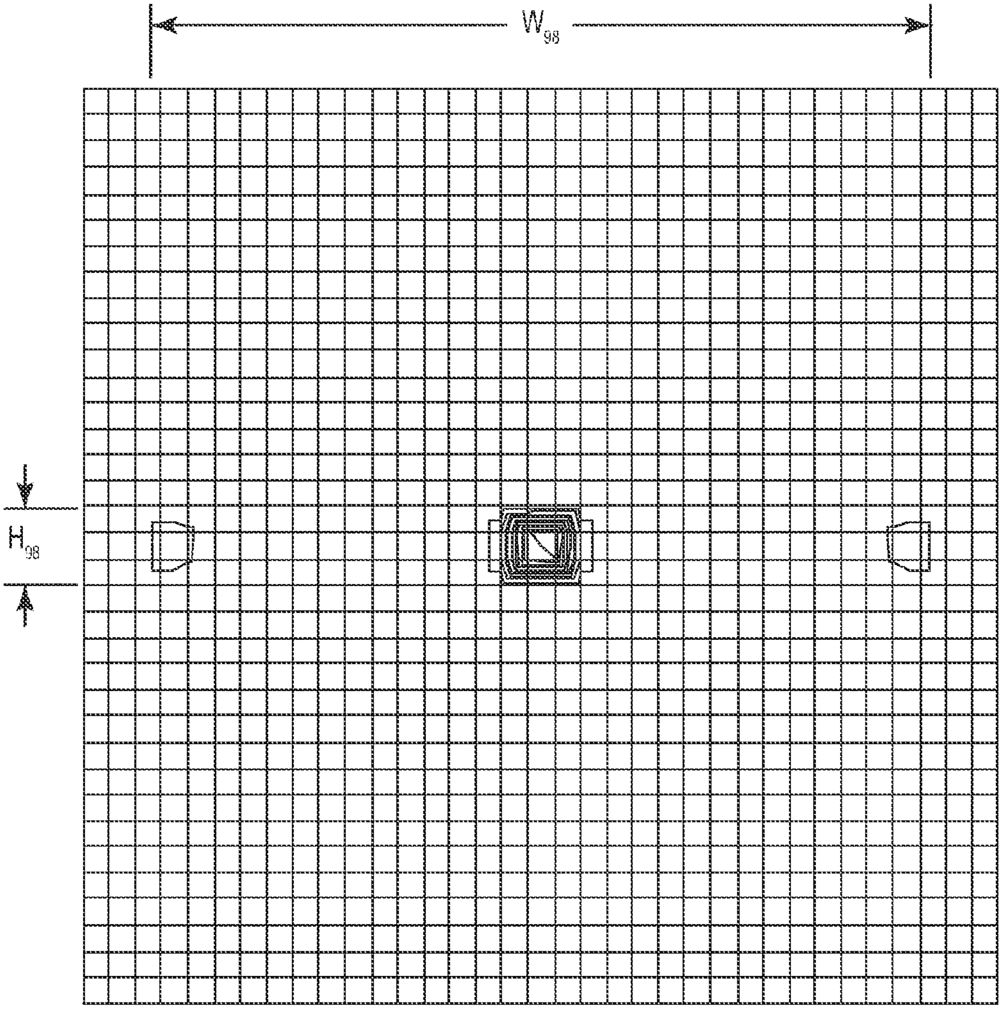
FIG. 7 illustrates a light pattern representative of a cross-section of a light beam from a light source assembly in accordance with one embodiment.

FIG. 7 illustrates a profile of a light pattern representative of light beam 98 from light source assembly 90 in accordance with one embodiment. In the illustration, light beam 98 correlates with the three substantially parallel light beams from the individual lenses of GRIN lens array 94. As with previously described light beams 18 and 88, light beam 98 also has an overall beam width $W_{98}$ that is larger than is its overall beam height $H_{98}$.

As with light source assembly 70 previously, in one embodiment light source assembly 90 is in a drop detector arrangement, such as arrangement 10. As above, in one embodiment the drop detector arrangement includes drop ejectors in three parallel rows and each individual beamlet of light of light beam 98 is substantially below a row of ejectors. Accordingly, light beam 98 of light source assembly 90 focuses light under ejectors where scattered light is to be produced. As above, more or less beamlets can be used for more or less ejector rows.

Where additional or less rows of ejectors are provided in a drop detector arrangement, a correlating amount of individual light beams of light beam 98 can be produced with light source assembly 90, such as by adjusting the number of individual GRIN lenses in GRIN lens array 94.

In one embodiment, light beam 98 of light source assembly 90 works over a relatively long distance in a drop detector arrangement. For example, if placed in drop detector arrangement 10 illustrated in FIG. 1, light source assembly 90 (replacing light source assembly 16) produces a light beam 98 (replacing light beam 18) that has a consistent profile over its length in the y-axis direction. Although its beam width $W_{98}$ and beam height $H_{98}$ will both increase as beam 98 moves out in the y-axis direction, the configuration of light source assembly 90 provides a usable light beam 98 over a substantial distance over its length in the y-axis direction. The light profile illustrated in FIG. 7 is a cross-sectional view taken at a location in the y-axis direction, and is representative of the light beam 98 profile over the distance where droplets will pass through.

Although specific embodiments have been illustrated and described herein, it will be appreciated by those of ordinary skill in the art that a variety of alternate and/or equivalent implementations may be substituted for the specific embodiments shown and described without departing from the scope of the present invention. For example, the drop detector arrangement 10 could be used in conjunction with a computer printer, or with any of a variety of drop ejection systems while remaining within the spirit and scope of the present invention. This application is intended to cover any adaptations or variations of the specific embodiments discussed herein. Therefore, it is intended that this invention be limited only by the claims and the equivalents thereof.

What is claimed is:

1. A light source assembly in a drop detection arrangement, the light source assembly comprising:
a single light source; and
a gradient-index lens array that at least partially collimates light from the light source and to project a single collimated light beam into the drop detection arrangement in a direction transverse to a drop direction of droplets in the drop detection arrangement;
wherein the light source assembly projects the single collimated light beam such that it has a beam width in a direction transverse to the drop direction that is larger than a beam height in the drop direction.

2. The light source assembly of claim 1 further comprising an initial lens between the light source and the gradient-index lens array that couples light from the light source into the gradient-index lens array.

3. The light source assembly of claim 2 further comprising an exit lens adjacent the gradient-index lens array that at least partially collimates light from the gradient-index lens array into the light beam.

4. The light source assembly of claim 3, wherein the initial and exit lenses comprise at least one of a group comprising spherical, aspheric, cylindrical, acylindrical, Fresnel, diffraction, and lenticular lenses.

5. The light source assembly of claim 1, wherein the light source assembly produces the light beam such that its beam width in a direction transverse to the drop direction is four times larger than its beam height in the drop direction.

6. The light source assembly of claim 1, wherein the gradient-index lens array comprises a plurality of individual gradient index lenses, which each generate individual beamlets of light making up the light beam.

7. The light source assembly of claim 6, wherein the drop detection arrangement comprises a plurality of rows of ejector nozzles to eject the droplets, and wherein each individual beamlet of light correspond to a row of ejector nozzles.

8. The light source assembly of claim 6, wherein the plurality of individual gradient index lenses are in a fan array at angles relative to each other such that the individual beamlets of light are spaced apart at a distance that is a function of the angles between the individual gradient index lenses.

9. The light source assembly of claim 6, wherein the plurality of individual gradient index lenses are parallel to each other.

10. A drop detection arrangement comprising:
a light source assembly comprising a light source and a gradient-index lens array to project a light beam;
a plurality of liquid drop ejectors for ejecting liquid drops in a drop direction through the light beam to scatter light off of the ejected drops, the plurality of liquid drop ejectors having an ejector width in a direction transverse to the drop direction;
a light collector to collect the scattered light off the ejected drops and to process the scattered light into an output signal; and
a controller to receive the output signal from the light collector and to measure conditions of the plurality of ejectors as a function of the collected scattered light;
wherein the light source assembly produces a light beam having a beam width in a direction transverse to the drop direction that is larger than a beam height in the drop direction, and wherein the light source assembly is configured to produce the beam width to cover the ejector width.

11. The drop detection arrangement of claim 10 further comprising initial lenses between the light source and the gradient-index lens array to couple light from the light source into the gradient-index lens array.

12. The drop detection arrangement of claim 11 further comprising exit lenses adjacent the gradient-index lens array to at least partially collimate light from the gradient-index lens array into the light beam.

13. The drop detection arrangement of claim 12, wherein the initial and exit lenses comprise at least one of a group comprising spherical, aspheric, cylindrical, acylindrical, Fresnel, diffraction, and lenticular lenses.

14. The drop detection arrangement of claim 10, wherein the gradient-index lens array comprises a plurality of individual gradient index lenses, which each generate individual beamlets of light making up the light beam.

15. The drop detection arrangement of claim 14, wherein the drop detection arrangement comprises a plurality of rows of ejector nozzles to eject the droplets, and wherein each individual beamlet of light correspond to a row of ejector nozzles.

16. The drop detection arrangement of claim 10, wherein the light source assembly produces the light beam such that its beam width in a direction transverse to the drop direction is four times larger than its beam height in the drop direction.

17. A method of projecting a collimated light beam in a drop ejection system, the method comprising:
projecting a light from a single light source;
collimating light from the single light source with a gradient-index lens array to project a single collimated light beam into the drop ejection system in a direction transverse to a drop direction of droplets in the drop detection arrangement; and
controlling the single collimated light beam such that it has a beam width in a direction transverse to the drop direction that is larger than a beam height in the drop direction.

18. The method of claim 17 further comprising providing an initial lens between the light source and the gradient-index lens array to couple light from the light source into the gradient-index lens array.

19. The method of claim 17 further comprising providing an exit lens adjacent the gradient-index lens array to at least partially collimate light from the gradient-index lens array into the light beam.

20. The method of claim 17 further comprising providing the gradient-index lens array having a plurality of individual gradient index lenses, which each generate individual beamlets of light making up the light beam.

* * * * *